(12) United States Patent
Won et al.

(10) Patent No.: US 11,891,487 B2
(45) Date of Patent: Feb. 6, 2024

(54) PREPARATION METHOD OF SUPER ABSORBENT POLYMER AND SUPER ABSORBENT POLYMER THEREFROM

(71) Applicant: LG Chem, Ltd., Seoul (KR)

(72) Inventors: Tae Young Won, Daejeon (KR); Hyemin Lee, Daejeon (KR); Junwye Lee, Daejeon (KR); Seongbeom Heo, Daejeon (KR); Kwangin Shin, Daejeon (KR); Chang Hun Han, Daejeon (KR)

(73) Assignee: LG Chem, Ltd.

( * ) Notice: Subject to any disclaimer, the term of this patent is extended or adjusted under 35 U.S.C. 154(b) by 75 days.

(21) Appl. No.: 17/051,859

(22) PCT Filed: Sep. 24, 2019

(86) PCT No.: PCT/KR2019/012410
§ 371 (c)(1),
(2) Date: Oct. 30, 2020

(87) PCT Pub. No.: WO2020/067705
PCT Pub. Date: Apr. 2, 2020

(65) Prior Publication Data
US 2021/0230376 A1 Jul. 29, 2021

(30) Foreign Application Priority Data
Sep. 28, 2018 (KR) .......................... 10-2018-0116453

(51) Int. Cl.
*C08J 3/075* (2006.01)
*C08J 3/12* (2006.01)
*C08J 3/24* (2006.01)
*C08L 101/14* (2006.01)

(52) U.S. Cl.
CPC ................ *C08J 3/075* (2013.01); *C08J 3/12* (2013.01); *C08J 3/24* (2013.01); *C08L 101/14* (2013.01); *C08J 2323/06* (2013.01); *C08L 2312/00* (2013.01)

(58) Field of Classification Search
None
See application file for complete search history.

(56) References Cited

U.S. PATENT DOCUMENTS

| 5,562,646 | A | 10/1996 | Goldman et al. |
|---|---|---|---|
| 5,981,070 | A | 11/1999 | Ishizaki et al. |
| 6,414,214 | B1 | 7/2002 | Engelhardt et al. |
| 2003/0219573 | A1* | 11/2003 | Falk .................... C08J 3/243 428/195.1 |
| 2004/0106745 | A1 | 6/2004 | Nakashima et al. |
| 2007/0134492 | A1 | 6/2007 | Ehrnsperger et al. |
| 2008/0125533 | A1 | 5/2008 | Riegel et al. |
| 2008/0187755 | A1 | 8/2008 | Herfert et al. |
| 2011/0097278 | A1 | 4/2011 | Verboom |
| 2012/0010372 | A1 | 1/2012 | Fujino et al. |
| 2014/0058048 | A1 | 2/2014 | Won et al. |
| 2015/0315321 | A1 | 11/2015 | Won et al. |
| 2016/0208035 | A1 | 7/2016 | Ryu et al. |
| 2017/0073478 | A1 | 3/2017 | Joo et al. |
| 2017/0189575 | A1 | 7/2017 | Lee et al. |
| 2018/0037686 | A1* | 2/2018 | Lee ........................... C08J 3/12 |
| 2018/0257059 | A1 | 9/2018 | Heo et al. |
| 2018/0312645 | A1 | 11/2018 | Lee et al. |
| 2019/0099739 | A1 | 4/2019 | Lee et al. |
| 2020/0009530 | A1 | 1/2020 | Ahn et al. |
| 2020/0010624 | A1 | 1/2020 | Nam et al. |
| 2020/0122119 | A1 | 4/2020 | Jeong et al. |
| 2020/0164344 | A1* | 5/2020 | Kim ......................... C08J 9/104 |
| 2021/0229070 | A1 | 7/2021 | Sohn et al. |
| 2021/0230376 | A1 | 7/2021 | Won et al. |
| 2022/0009530 | A1* | 1/2022 | Alvarez ................. B61D 49/00 |

FOREIGN PATENT DOCUMENTS

| CA | 2433044 | A1 | 7/2002 |
|---|---|---|---|
| CN | 1635914 | A | 7/2005 |
| CN | 106133031 | A | 11/2016 |
| EP | 0761241 | A2 | 3/1997 |
| EP | 2535027 | A1 | 12/2012 |
| EP | 2881419 | A1 | 6/2015 |
| EP | 3156427 | A1 | 4/2017 |
| EP | 3241861 | A1 | 11/2017 |
| EP | 3345958 | A1 | 7/2018 |
| EP | 3406653 | A1 | 11/2018 |
| EP | 3438162 | A1 | 2/2019 |
| EP | 3527611 | A1 | 8/2019 |
| JP | H06298841 | A | 10/1994 |
| JP | H09157534 | A | 6/1997 |
| JP | 2003511489 | A | 3/2003 |
| JP | 2003105092 | A | 4/2003 |
| JP | 3461860 | B2 | 10/2003 |
| JP | 2004517173 | A | 6/2004 |
| JP | 2005536292 | A | 12/2005 |

(Continued)

OTHER PUBLICATIONS

International Search Report for Application No. PCT/KR2019/012410 dated Jan. 10, 2020, 2 pages.

(Continued)

*Primary Examiner* — Joseph D Anthony
(74) *Attorney, Agent, or Firm* — Lerner David LLP

(57) ABSTRACT

The present disclosure relates to a preparation method of a super absorbent polymer having excellent basic absorbency and liquid permeability at the same time by optimizing the degree of cross-linking of a base resin powder and a surface cross-linked layer, and a super absorbent polymer prepared therefrom. The preparation method of a super absorbent polymer includes: forming a hydrogel polymer by cross-linking and polymerizing a monomer composition including a water-soluble ethylene-based unsaturated monomer having a degree of neutralization of less than 72 mol % and an internal cross-linking agent; drying, pulverizing and classifying the hydrogel polymer to form a base resin powder; forming a surface cross-linked layer by further cross-linking a surface of the base resin powder in the presence of a surface cross-linking agent; and further neutralizing the base resin powder by treating the base resin powder with a basic solution during or after forming a surface cross-linked layer.

5 Claims, No Drawings

(56) References Cited

FOREIGN PATENT DOCUMENTS

| | | | |
|---|---|---|---|
| JP | 2008517116 A | 5/2008 | |
| JP | 2008528750 A | 7/2008 | |
| JP | 2009209373 A | 9/2009 | |
| JP | 2010017536 A | 1/2010 | |
| JP | 2016516877 A | 6/2016 | |
| JP | 2017517600 A | 6/2017 | |
| KR | 20100040252 A | 4/2010 | |
| KR | 20110111938 A | 10/2011 | |
| KR | 20120054836 A | 5/2012 | |
| KR | 20170057705 A | 5/2017 | |
| KR | 20170112856 A | 10/2017 | |
| KR | 20180011474 A | 2/2018 | |
| KR | 20180067940 A | 6/2018 | |
| KR | 20180067943 A | 6/2018 | |
| KR | 20180074384 A | 7/2018 | |
| KR | 20180074385 A | 7/2018 | |
| WO | 1997003114 A1 | 1/1997 | |
| WO | 2002100451 A2 | 12/2002 | |
| WO | 2009079288 A1 | 6/2009 | |
| WO | 2010090324 A1 | 8/2010 | |
| WO | 2018110760 A1 | 6/2018 | |
| WO | 2018117391 A1 | 6/2018 | |
| WO | 2018139768 A1 | 8/2018 | |
| WO | 2020067705 A1 | 4/2020 | |
| WO | 2020111421 A1 | 6/2020 | |
| WO | 2020122444 A1 | 6/2020 | |

OTHER PUBLICATIONS

Odian, Principles of Polymerization, Second Edition, Copyright 1981 by John Wiley & Sons, Inc, p. 203.
Schwalm, UV Coatings; Basics, Recent Developments and New Applications, Dec. 21, 2006, p. 115, Elsevier Science.
Third Party Observation for PCT/KR2019/012410 dated Jun. 25, 2020, 14 pages.
Database WPI, week 199502, Thomson Scientific, AN 1995-011861, XP002802811 & JP H06298841 A (Arakawa Chem Ind Ltd), Oct. 1994, 2 pages, London, GB. Abstract.
Database WPI, week 201848, Thomson Scientific, AN 2018-50959J, XP002802812 & WO 2018/117391 A1 (LG Chem Ltd), Jun. 2018, 4 pages, London, GB. Abstract.
Database WPI, week 201856, Thomson Scientific, AN 2018-603789, XP002802813 & WO 2018/139768 A1 (LG Chem Co Ltd), Aug. 2018, 6 pages, London, GB. Abstract.
Extended European Search Report including Written Opinion for Application No. 19867685.0 dated May 11, 2021, pp. 1-12.
Buchholz, F., et al., "Modern Superabsorbent Polymer Technology", WILEY-VCH (1998). 55 pgs.
Third Party Observation for European Patent Application No. 19867685.0, dated May 17, 2023, pp. 1-12.

\* cited by examiner

PREPARATION METHOD OF SUPER ABSORBENT POLYMER AND SUPER ABSORBENT POLYMER THEREFROM

CROSS-REFERENCE TO RELATED APPLICATIONS

The present application is a national phase entry under 35 U.S.C. § 371 of International Application No. PCT/KR2019/012410, filed Sep. 24, 2019, which claims priority to Korean Patent Application No. 10-2018-01164532, filed on Sep. 28, 2018, the disclosures of which are incorporated herein by reference in their entirety.

TECHNICAL FIELD

The present disclosure relates to a preparation method of a super absorbent polymer having excellent basic absorbency and liquid permeability at the same time by optimizing the degree of cross-linking of a base resin powder and a surface cross-linked layer, and a super absorbent polymer prepared therefrom.

BACKGROUND OF ART

A super absorbent polymer (SAP) is a type of synthetic polymeric material capable of absorbing 500 to 1000 times its own weight of moisture. Various manufacturers have denominated it with different names, such as SAM (Super Absorbency Material), AGM (Absorbent Gel Material), and the like. Such super absorbent polymers started to be practically applied in sanitary products, and they are now being widely used not only for hygiene products such as disposable diapers for children, etc., but also for water retaining soil products for gardening, water stop materials for the civil engineering and construction, sheets for raising seedling, fresh-keeping agents for food distribution fields, materials for poultices, or the like.

In most cases, these super absorbent polymers have been widely used in the field of hygienic materials such as diapers or sanitary napkins. For these applications, the super absorbent polymer should exhibit high moisture absorbency, it should not release the absorbed water even in the external pressure (high absorbency under pressure), and additionally it should well retain the shape even in a state where the volume is expanded (swelled) by absorbing water, thereby exhibiting excellent liquid permeability.

In recent years, as the demand for a thin diaper increases, the content of fibrous materials such as pulp in the diaper decreases, and the proportion of the super absorbent polymer in the diaper tends to increase. Therefore, the super absorbent polymer needs to have the performance of the fibrous material of the diaper. For this, the super absorbent polymer should have high absorbency as well as a high absorption rate and liquid permeability. Particularly, as the diaper becomes thinner, the baby's movement increases the risk of urine leaking from the diaper, and thus the demand for a high absorption rate of the super absorbent polymer is increasing.

However, it is known that it is very difficult to simultaneously improve the absorbency and absorption rate, and the absorbency under pressure and liquid permeability, due to structural characteristics of the super absorbent polymer. In order to increase the absorbency under pressure and liquid permeability, it is necessary to increase a cross-linking density of a surface cross-linked layer and gel strength of super absorbent polymer particles. However, in this case, an internal cross-linking density of the base resin powder inside the surface cross-linked layer is increased, and the absorbency and absorption rate tend to decrease.

As a result, there is a continuing need for developing a technique capable of optimizing the degree of cross-linking of a base resin powder and a surface cross-linked layer, and simultaneously exhibiting the basic absorbency and absorption rate, and the liquid permeability and absorbency under pressure.

DETAILED DESCRIPTION OF THE INVENTION

Technical Problem

The present disclosure is to provide a preparation method of a super absorbent polymer having excellent basic absorbency and liquid permeability at the same time by optimizing the degree of cross-linking of a base resin powder and a surface cross-linked layer.

The present disclosure is also to provide a super absorbent polymer prepared by the above method, which has excellent basic absorbency and liquid permeability at the same time.

Technical Solution

In the present disclosure, there is provided a preparation method of a super absorbent polymer, including the steps of:
  forming a hydrogel polymer by cross-linking and polymerizing a monomer composition including a water-soluble ethylene-based unsaturated monomer having at least partially neutralized acidic groups and an internal cross-linking agent;
  drying, pulverizing and classifying the hydrogel polymer to form a base resin powder; and
  forming a surface cross-linked layer by further cross-linking a surface of the base resin powder in the presence of a surface cross-linking agent,
  wherein the water-soluble ethylene-based unsaturated monomer has a degree of neutralization of less than 72 mol % in the step of forming a hydrogel polymer, and
  the preparation method further includes a step of further neutralizing the base resin powder by treating the base resin powder with a basic solution during the step of forming a surface cross-linked layer or after the step of forming a surface cross-linked layer.

In the present disclosure, there is also provided a super absorbent polymer, including a base resin powder containing a first cross-linked polymer of a water-soluble ethylene-based unsaturated monomer having at least partially neutralized acidic groups; and
  a surface cross-linked layer in which the first cross-linked polymer is additionally cross-linked by a surface cross-linking agent on the base resin powder,
  wherein a degree of neutralization measured for extractable components of the super absorbent polymer is greater than 70 mol %,
  centrifuge retention capacity (CRC) to saline (0.9 wt % aqueous solution of sodium chloride) for 30 min is 28 g/g or more, and
  saline (0.685 wt % aqueous solution of sodium chloride) flow conductivity (SFC; $\cdot 10^{-7}$ cm$^3\cdot$s/g) is 30 ($\cdot 10^{-7}$ cm$^3\cdot$s/g) or more.

Hereinafter, a super absorbent polymer and a preparation method of the same according to specific embodiments of the present invention will be described in detail. However, this is merely presented as an example of the present invention, and will be apparent to those skilled in the art that the scope of the present invention is not limited to these embodiments, and various modifications can be made to the embodiments within the scope of the present invention.

In addition, unless stated otherwise throughout this specification, the term "comprise" "include" or "contain" refers to including any constituent element (or constituent component) without particular limitation, and it cannot be interpreted as a meaning of excluding an addition of other constituent element (or constituent component).

According to one embodiment of the present disclosure, there is provided a preparation method of a super absorbent polymer, including the steps of:

forming a hydrogel polymer by cross-linking and polymerizing a monomer composition including a water-soluble ethylene-based unsaturated monomer having at least partially neutralized acidic groups and an internal cross-linking agent;

drying, pulverizing and classifying the hydrogel polymer to form a base resin powder; and forming a surface cross-linked layer by further cross-linking a surface of the base resin powder in the presence of a surface cross-linking agent, wherein the water-soluble ethylene-based unsaturated monomer has a degree of neutralization of less than 72 mol % in the step of forming a hydrogel polymer, and the preparation method further includes a step of further neutralizing the base resin powder by treating the base resin powder with a basic solution during the step of forming a surface cross-linked layer or after the step of forming a surface cross-linked layer.

The preparation method of a super absorbent polymer of one embodiment prepares a base resin powder by performing an initial neutralization process of monomers for cross-linking polymerization such that a degree of neutralization of the monomers is less than 70 mol %, 40 to 69 mol %, or 50 to 65 mol %, and then performing the cross-linking polymerization. Moreover, in the surface cross-linking of the base resin powder, a neutralization step using a basic solution is further performed during the step of forming a surface cross-linked layer or after the step of forming a surface cross-linked layer.

As a result of continuous experiments of the present inventors, it has been found that the degree of cross-linking of a base resin powder and a surface cross-linked layer is optimized together, when the surface cross-linked layer is formed after preparing the base resin powder by controlling the degree of neutralization of monomers to be relatively low, or an additional neutralization step is performed after forming the surface cross-linked layer. Then, they have found that a super absorbent polymer having improved basic absorbency and absorption rate, and improved liquid permeability and absorbency under pressure at the same time can be prepared, and completed the invention.

This is because the degree of neutralization of the monomer, base resin powder and/or surface cross-linked super absorbent polymer for preparing a super absorbent polymer may affect the progress of a cross-linking reaction or the degree of cross-linking. However, since the neutralization process was performed only for the monomer before the cross-linking polymerization in the conventional process, it was difficult to control the degree of neutralization during/after surface cross-linking.

However, in the preparation method of one embodiment, as the additional neutralization process is performed after the initiation of the surface cross-linking reaction, the degree of neutralization during/after surface cross-linking can be appropriately controlled, and as a result, the degree of cross-linking of the surface cross-linked layer in the surface cross-linked super absorbent polymer as well as in the base resin powder can be controlled to a desired level.

As a result, it seems that the degree of neutralization/cross-linking not only in the base resin powder, but also in the surface cross-linked layer of the super absorbent polymer prepared by the method of one embodiment is controlled to a desired level, and thus liquid permeability and absorbency under pressure, as well as basic absorbency and absorption rate, can be improved together.

Therefore, the super absorbent polymer prepared by the method of one embodiment can exhibit excellent physical properties of both sides together, unlike the conventional common sense that it is difficult to improve the basic absorbency and absorption rate, and the liquid permeability and absorbency under pressure together. Thus, it can be preferably applied to sanitary materials such as diapers having a thinner thickness.

Hereinafter, a preparation method of one embodiment will be described in more detail in each step.

In the preparation method of a super absorbent polymer of one embodiment, a monomer composition, which is a raw material of the super absorbent polymer, including an acrylic acid-based monomer having at least partially neutralized acidic groups, an internal cross-linking agent and a polymerization initiator is polymerized to form a hydrogel polymer, and then dried, pulverized and classified to form a base resin powder.

This will be described in more detail.

The monomer composition, which is a raw material of the super absorbent polymer, includes a water-soluble ethylene-based unsaturated monomer having at least partially neutralized acidic groups, more specifically an acrylic acid-based monomer, and an internal cross-linking agent.

The acrylic acid-based monomer is a compound represented by the following Chemical Formula 1:

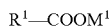   [Chemical Formula 1]

in Chemical Formula 1, $R^1$ is a C2 to C5 alkyl group having an unsaturated bond, and $M^1$ is a hydrogen atom, a monovalent or divalent metal, an ammonium group, or an organic amine salt.

Preferably, the acrylic acid-based monomer includes at least one selected from the group consisting of acrylic acid, methacrylic acid, and a monovalent metal salt, a divalent metal salt, an ammonium salt, and an organic amine salt thereof.

Herein, the acrylic acid-based monomers may be those having acidic groups which are at least partially neutralized. Preferably, the monomers may be those partially neutralized with an alkali substance such as sodium hydroxide, potassium hydroxide, ammonium hydroxide, or the like. In this regard, a degree of neutralization of the acrylic acid-based monomer may be 70 mol % or less, 40 to 69 mol %, or 50 to 65 mol %.

An excessively high degree of neutralization precipitates the neutralized monomers, and thus polymerization may not readily occur. Furthermore, the effect of additional neutralization after the initiation of surface cross-linking is substantially eliminated, so that a degree of cross-linking of the surface cross-linked layer is not optimized, and liquid permeability of the super absorbent polymer may not be sufficient. On the contrary, an excessively low degree of neutralization not only deteriorates the absorbency of the polymer, but also endows the polymer with hard-to-handle properties, such as those of an elastic rubber.

The concentration of the monomer may be 20 to 60 wt %, 30 to 55 wt %, or 40 to 50 wt % based on the monomer composition including raw materials of the super absorbent polymer and a solvent, and properly controlled in consideration of polymerization time and reaction conditions. However, when the concentration of the monomer is excessively low, the yield of the super absorbent polymer may become low and economical efficiency may be reduced. On the contrary, when the concentration of the monomer is excessively high, there is a process problem that a part of the monomers is precipitated, or pulverization efficiency is lowered upon pulverization of the polymerized hydrogel polymer, and the physical properties of the super absorbent polymer may be deteriorated.

In the preparation method of a super absorbent polymer of one embodiment, a polymerization initiator that has been generally used for preparing a super absorbent polymer can be applied without particular limitations.

Specifically, the polymerization initiator may be an initiator for thermal polymerization or an initiator for photopolymerization by UV radiation according to the polymerization method. However, even when the photopolymerization method is applied thereto, a certain amount heat is generated by UV radiation and the like, and some heat occurs as the polymerization reaction, an exothermal reaction, progresses. Therefore, the composition may additionally include the thermal polymerization initiator.

Any compound which can form a radical by light such as UV rays may be used as the photopolymerization initiator without limitation.

For example, the photopolymerization initiator may be one or more compounds selected from the group consisting of benzoin ether, dialkyl acetophenone, hydroxyl alkylketone, phenyl glyoxylate, benzyl dimethyl ketal, acyl phosphine, and α-aminoketone. Further, as the specific example of acyl phosphine, commercial lucirin TPO, namely, 2,4,6-trimethyl-benzoyl-trimethyl phosphine oxide, may be used. More various photopolymerization initiators are well disclosed in "UV Coatings: Basics, Recent Developments and New Application (Elsevier, 2007)" written by Reinhold Schwalm, p 115, and the present invention is not limited thereto.

The concentration of the photopolymerization initiator in the monomer composition may be 0.01 to 1.0 wt %, 0.1 to 0.9 wt %, or 0.3 to 0.7 wt %. When the concentration of the photopolymerization initiator is excessively low, the polymerization rate becomes slow, and when the concentration of the photopolymerization initiator is excessively high, the molecular weight of the super absorbent polymer becomes low and the properties may be uneven.

Furthermore, as the thermal polymerization initiator, one or more initiators selected from the group consisting of a persulfate-based initiator, an azo-based initiator, hydrogen peroxide, and ascorbic acid may be used. Specifically, sodium persulfate ($Na_2S_2O_8$), potassium persulfate ($K_2S_2O_8$), ammonium persulfate (($NH_4)_2S_2O_8$), and the like may be used as examples of the persulfate-based initiators; and 2,2-azobis-(2-amidinopropane)dihydrochloride, 2,2-azobis-(N,N-dimethylene)isobutyramidinedihydrochloride, 2-(carbamoylazo)isobutyronitril, 2,2-azobis-[2-(2-imidazolin-2-yl)propane]dihydrochloride, 4,4-azobis-(4-cyanovaleric acid), and the like may be used as examples of azo-based initiators. More various thermal polymerization initiators are well disclosed in "Principle of Polymerization (Wiley, 1981)" written by Odian, p 203, and the present invention is not limited thereto.

According to one embodiment of the present disclosure, the monomer composition includes an internal cross-linking agent as a raw material of the super absorbent polymer. The internal cross-linking agent is used for cross-linking the interior of a polymer in which an acrylic acid-based monomer is polymerized, that is, a base resin, and is different from the surface cross-linking agent for cross-linking the surface of the polymer.

The kind of the internal cross-linking agent is not particularly limited, and any internal cross-linking agent that has been generally used for preparing a super absorbent polymer can be applied without particular limitations. Specific examples of the internal cross-linking agent include poly(meth)acrylate-based compounds of a C2 to C20 polyol, polyglycidyl ether-based compounds of a C2 to C20 polyol, allyl (meth)acrylate-based compounds having 2 to 20 carbon atoms, and the like.

More specific examples of the internal cross-linking agent include trimethylolpropane tri(meth)acrylate, ethyleneglycol di(meth)acrylate, polyethyleneglycol di(meth)acrylate, propyleneglycol di(meth)acrylate, polypropyleneglycol di(meth)acrylate, butanediol di(meth)acrylate, butyleneglycol di(meth)acrylate, diethyleneglycol di(meth)acrylate, hexanediol di(meth)acrylate, triethyleneglycol di(meth)acrylate, tripropyleneglycol di(meth)acrylate, tetraethyleneglycol di(meth)acrylate, dipentaerythritol pentaacrylate, glycerin tri(meth)acrylate, pentaerythritol tetraacrylate, ethyleneglycol diglycidyl ether, polyethyleneglycol diglycidyl ether, glycerol polyglycidyl ether, propyleneglycol diglycidyl ether, polypropyleneglycol diglycidyl ether, and the like, and various other polyfunctional compounds can be used as the internal cross-linking agent.

The internal cross-linking agent is included in a concentration of 0.01 to 1 wt %, 0.05 to 0.8 wt %, or 0.2 to 0.7 wt % based on the monomer composition, thereby forming a cross-linking structure inside the hydrogel polymer and the base resin powder formed therefrom.

In the preparation method of one embodiment, the monomer composition may further include an additive such as a thickener, a plasticizer, a preservation stabilizer, an antioxidant, and the like, if necessary.

The raw materials such as the monomer having at least partially neutralized acidic groups, the photopolymerization initiator, the thermal polymerization initiator, the internal cross-linking agent, and the additive may be prepared in the form of a solution dissolved in a solvent.

At this time, any solvent which can dissolve the components may be used without limitation, and for example, one or more solvents selected from water, ethanol, ethyleneglycol, diethyleneglycol, triethyleneglycol, 1,4-butanediol, propyleneglycol, ethyleneglycol monobutylether, propyleneglycol monomethylether, propyleneglycol monomethylether acetate, methylethylketone, acetone, methylamylketone, cyclohexanone, cyclopentanone, diethyleneglycol monomethylether, diethyleneglycol ethylether, toluene, xylene, butyrolactone, carbitol, methylcellosolve acetate, and N,N-dimethylacetamide may be used.

The solvent may be included in the monomer composition at a residual quantity excluding the above components.

Meanwhile, the method of preparing the hydrogel polymer by thermal polymerization or photopolymerization of the monomer composition is not particularly limited if it is a common polymerization method.

Specifically, the polymerization method is largely divided into thermal polymerization and photopolymerization according to an energy source of the polymerization. In the case of thermal polymerization, it is generally carried out in a reactor having an agitation spindle, such as a kneader. In the case of photopolymerization, it may be carried out in a reactor equipped with a movable conveyor belt. However, the polymerization method is just an example, and the present invention is not limited thereto.

For example, in a reactor equipped with an agitation spindle such as a kneader, the hydrogel polymer obtained by thermal polymerization by supplying hot air or heating the reactor may be discharged to a reactor outlet in the form of several centimeters to several millimeters depending on a shape of the agitation spindle provided in the reactor. Specifically, a size of the hydrogel polymer obtained may vary depending on the concentration and injection rate of the monomer composition to be injected, and a hydrogel polymer having a weight average particle diameter of 2 to 50 mm or 3 to 30 mm may be usually obtained.

In addition, when photopolymerization is performed in the reactor equipped with a movable conveyor belt as described above, a hydrogel polymer in the form of a sheet having a belt width may usually be obtained. At this time, a thickness of the polymer sheet may vary depending on the concentration and injection rate of the monomer composition to be injected, and it is preferable to supply the monomer composition so that the polymer in the form of a sheet has a thickness of 0.5 to 5 cm, or 1 to 3 cm. When the monomer composition is supplied to such an extent that the thickness of the polymer sheet is too thin, the production efficiency may be low. When the thickness of the polymer sheet exceeds 5 cm, the polymerization reaction may not occur evenly over the entire thickness due to the excessively thick thickness.

Generally, the moisture content of the hydrogel polymer obtained by the above method may be 40 to 80 wt %, or 50 to 70 wt %. At this time, "moisture content" in the present description is the content of moisture in the entire weight of the hydrogel polymer, and it means a value of which the weight of the dried polymer is subtracted from the weight of the hydrogel polymer. Specifically, the moisture content is defined as a value calculated from the weight loss due to moisture evaporation from the polymer in the process of increasing the temperature of the polymer and drying the same through infrared heating. At this time, the drying condition for measuring the moisture content is that the temperature is increased to 180° C. and maintained at 180° C., and the total drying time is 20 min including 5 min of a heating step.

Subsequently, the hydrogel polymer is dried.

Herein, a coarse pulverizing step may be further included before the drying step for increasing the drying efficiency, if necessary.

The pulverizing machine used is not particularly limited. Specifically, it may include at least one selected from the group consisting of a vertical pulverizer, a turbo cutter, a turbo grinder, a rotary cutter mill, a cutter mill, a disc mill, a shred crusher, a crusher, a chopper, and a disc cutter, but it is not limited thereto.

In the pulverizing step, the hydrogel polymer may be crushed to have a diameter of 2 to 10 mm, or 3 to 8 mm. The diameter of the hydrogel polymer may be defined as the longest distance among linear distances connecting arbitrary points on the surface of the hydrogel polymer.

It is technically difficult to pulverize the hydrogel polymer to have a diameter of less than 2 mm because of its high moisture content, and there may be a phenomenon that the crushed particles cohere with each other. Meanwhile, when the polymer is crushed to have a diameter of larger than 10 mm, the efficiency enhancing effect in the subsequent drying step may be low.

The hydrogel polymer pulverized as above or the hydrogel polymer immediately after the polymerization without the pulverizing step is subjected to drying. At this time, the drying temperature of the drying step may be 150 to 250° C. When the drying temperature is lower than 150° C., the drying time may become excessively long and the properties of the super absorbent polymer finally prepared may decrease. And when the drying temperature is higher than 250° C., the surface of the polymer is excessively dried to generate fine powders in a subsequent pulverizing process, and the properties of the super absorbent polymer finally prepared may decrease. Therefore, the drying process may be preferably carried out at a temperature of 150 to 200° C., more preferably at a temperature of 160 to 180° C.

Furthermore, the drying time may be 20 to 90 minutes, or 30 to 70 minutes in consideration of process efficiency, but it is not limited thereto.

The drying method in the drying step is not particularly limited if it has been generally used in the drying process of the hydrogel polymer. Specifically, the drying step may be carried out by the method of hot air provision, infrared radiation, microwave radiation, UV ray radiation, and the like. The moisture content of the polymer after the drying step may be 0.1 to 10 wt %, or 1 to 8 wt %. When the moisture content after drying is too low, the hydrogel polymer may be deteriorated during the drying process, thereby degrading physical properties of the super absorbent polymer. Conversely, when the moisture content is too high, absorption performance may be reduced due to the large amount of moisture in the super absorbent polymer, or it may be difficult to perform subsequent processes.

Subsequently, a step of pulverizing the dried polymer obtained from the drying step is carried out.

The polymer powder obtained after the pulverization step may have a diameter of 150 to 850 µm. In order to pulverize the polymer into such diameter, a pin mill, a hammer mill, a screw mill, a roll mill, a disc mill, or a jog mill may be used as the pulverizer, but it is not limited thereto.

Further, in order to control the properties of the super absorbent polymer powder which is finally commercialized after the pulverization step, a separate process of classifying the polymer powders obtained after the pulverization according to the particle diameter may be carried out. The polymer powders may be classified to have a constant weight ratio according to the particle diameter.

After obtaining the base resin in the powder form through the above-described classification step, the base resin is heated in the presence of a surface cross-linking agent to carry out surface cross-linking.

In the general preparation method of a super absorbent polymer, a surface cross-linking solution containing a surface cross-linking agent is mixed with a dried, pulverized and classified polymer, that is, a base resin powder, and then the mixture is heated to carry out a surface cross-linking reaction of the base resin powder.

The surface cross-linking step is a step of inducing a cross-linking reaction on the surface of the pulverized polymer in the presence of a surface cross-linking agent to form a super absorbent polymer having improved physical properties. Through the surface cross-linking, a surface cross-linked layer is formed on the surface of the pulverized and classified base resin powder.

Generally, surface cross-linking agents are applied on the surface of the base resin powder, so that surface cross-linking reactions occur on the surface of the base resin powder, which improves cross-linkability on the surface of the particles without substantially affecting the interior of the particles. Therefore, the surface cross-linked super absorbent polymer particles have a higher degree of cross-linking near the surface than in the interior, as the cross-linked polymer on the surface of the base resin powder is further cross-linked.

Meanwhile, the surface cross-linking agent is a compound capable of reacting with functional groups of the base resin. For example, polyalcohol-based compounds, polyepoxy-based compounds, polyamine compounds, haloepoxy compounds, condensates of haloepoxy compounds, oxazoline-based compounds, or alkylene carbonate-based compounds may be used without particular limitations.

Specifically, the polyalcohol-based compound may include one or more selected from the group consisting of di-, tri-, tetra- or polyethylene glycol, 1,3-propanediol, dipropylene glycol, 2,3,4-trimethyl-1,3-pentanediol, polypropylene glycol, glycerol, polyglycerol, 2-butene-1,4-diol, 1,4-butanediol, 1,3-butanediol, 1,5-pentanediol, 1,6-hexanediol, and 1,2-cyclohexane dimethanol.

Further, the polyepoxy-based compound may include ethylene glycol diglycidyl ether, glycidol or the like. The polyamine compound may include one or more selected from the group consisting of ethylene diamine, diethylene triamine, triethylene tetraamine, tetraethylene pentamine, pentaethylene hexamine, polyethylene imine, and polyamide polyamine.

Further, the haloepoxy compound may include epichlorohydrin, epibromohydrin, or α-methylephichlorohydrin. Meanwhile, the mono-, di-, or polyoxazolidinone compound may include, for example, 2-oxazolidinone or the like.

Further, the alkylene carbonate-based compound may include ethylene carbonate, propylene carbonate, or the like. These may be used alone or in combination with each other.

The amount of the surface cross-linking agent added may be appropriately selected depending on the kind of the surface cross-linking agent added or the reaction conditions. However, the surface cross-linking agent may be generally used in an amount of 0.001 to 5 parts by weight, 0.01 to 3 parts by weight, or 0.05 to 2 parts by weight based on 100 parts by weight of the base resin powder.

When the amount of the surface cross-linking agent is excessively small, the surface cross-linking reaction hardly occurs, and when the amount is higher than 5 parts by weight based on 100 parts by weight of the polymer, absorbency such as water retention capacity may be deteriorated due to the excessive surface cross-linking reaction.

When the surface cross-linking agent is added, water may be further mixed together and added in the form of a surface cross-linking solution. When water is added, there is an advantage that the surface cross-linking agent can be uniformly dispersed in the polymer. Herein, the added amount of water is preferably 1 to 10 parts by weight based on 100 parts by weight of the polymer in order to optimize a surface penetration depth of the surface cross-linking agent, while inducing even dispersion of the surface cross-linking agent and preventing the polymer powder from aggregating.

Meanwhile, the above-mentioned surface cross-linking step may further use at least one selected from the group consisting of polyvalent metal salts, for example, aluminum salts, more specifically, sulfates, potassium salts, ammonium salts, sodium salts, and hydrochloride salts of aluminum, in addition to the surface cross-linking agent.

As the polyvalent metal salt is additionally used, liquid permeability of the super absorbent polymer prepared by the method of one embodiment may be further improved. The polyvalent metal salt may be added to the surface cross-linking solution together with the surface cross-linking agent, and may be used in an amount of 0.01 to 4 parts by weight based on 100 parts by weight of the base resin powder.

Meanwhile, the base resin powder is subjected to the surface cross-linking by heating the mixture of the base resin powder and the surface cross-linking solution.

The surface cross-linking step may be carried out under well-known conditions depending on the kind of the surface cross-linking agent, for example, at a temperature of 100 to 200° C. for 20 to 60 minutes. In a more specific example, the surface cross-linking step may be carried out by adding a surface cross-linking agent, and the like to the base resin powder having an initial temperature of 20° C. to 80° C., increasing the temperature to a maximum temperature of 140° C. to 200° C. over 10 minutes to 30 minutes, and maintaining the maximum temperature for 5 to 60 minutes for heat-treatment.

Depending on the surface cross-linking conditions, basic absorption characteristics such as water retention capacity of the super absorbent polymer, and liquid permeability and/or absorbency under pressure may be optimized together.

The heating means for the surface cross-linking reaction is not particularly limited. It is possible to provide a thermal media thereto or provide a heat source directly thereto. At this time, usable thermal media may be a heated fluid such as steam, hot air, hot oil, and the like, but the present invention is not limited thereto. Furthermore, the temperature of the thermal media provided thereto may be properly selected in consideration of the means of the thermal media, heating speed, and target temperature of heating. Meanwhile, an electric heater or a gas heater may be used as the heat source provided directly, but the present invention is not limited thereto.

Meanwhile, the preparation method of one embodiment may further include a step of further neutralizing the base resin powder by treating the base resin powder with a basic solution during the step of forming a surface cross-linked layer or after the step of forming a surface cross-linked layer. More specifically, the additional neutralization step may include a step of further neutralizing the base resin powder by treating it with a basic solution containing $Na^+$ ions after a surface cross-linking reaction is initiated by adding a surface cross-linking agent to the base resin powder and heating it to a temperature of 100° C. or higher, or after a surface cross-linking reaction is completed.

As the additional neutralization step is performed at any time after the surface cross-linking reaction is initiated or after the surface cross-linking reaction is completed, the degree of neutralization/cross-linking not only in the base resin powder, but also in the surface cross-linked layer is controlled to a desired level, and thus the super absorbent polymer finally prepared may exhibit improved liquid permeability and absorbency under pressure, as well as improved basic absorbency and absorption rate.

In the additional neutralization step, any basic solution usable in the neutralization process of the monomer may be used as the basic solution. More preferably, a basic aqueous solution containing $Na^+$ ions, more specifically, an aqueous solution of sodium hydroxide, an aqueous solution of sodium hydrogen carbonate or an aqueous solution of sodium carbonate may be used.

In addition, the basic solution may be used in an amount of 0.1 to 20 parts by weight, or 1 to 10 parts by weight based on 100 parts by weight of the base resin powder, so that the degree of neutralization of the surface cross-linked layer and the surface cross-linked super absorbent polymer can be controlled in an appropriate range.

The super absorbent polymer finally prepared through the additional neutralization step may have a degree of neutralization of greater than 70 mol %, 70.5 to 80 mol %, or 70.5 to 75 mol %, when measured for extractable components of the super absorbent polymer. As a result, the degree of neutralization and cross-linking of the surface cross-linked layer and the surface cross-linked super absorbent polymer are optimized, so that the super absorbent polymer maintains not only basic absorbency and absorption rate, but also excellent absorbency under pressure and liquid permeability.

The super absorbent polymer prepared by the above-described method includes a base resin powder containing a first cross-linked polymer of a water-soluble ethylene-based unsaturated monomer having at least partially neutralized acidic groups; and a surface cross-linked layer in which the first cross-linked polymer is additionally cross-linked by a surface cross-linking agent on the base resin powder, wherein a degree of neutralization measured for extractable components of the super absorbent polymer is greater than 70 mol %, centrifuge retention capacity (CRC) to saline (0.9 wt % aqueous solution of sodium chloride) for 30 min is 28 g/g or more, and saline (0.685 wt % aqueous solution of sodium chloride) flow conductivity (SFC; $\cdot 10^{-7}$ cm$^3 \cdot$s/g) is 30 ($\cdot 10^{-7}$ cm$^3 \cdot$s/g) or more.

Specifically, the super absorbent polymer may have centrifuge retention capacity (CRC) to saline (0.9 wt % aqueous solution of sodium chloride) for 30 min of 28 g/g or more, 29 g/g or more, or 30 g/g or more, and 40 g/g or less, 36 g/g or less, or 34 g/g or less, when measured according to the EDANA method WSP 241.3.

In addition, the super absorbent polymer of one embodiment may have saline (0.685 wt % aqueous solution of sodium chloride) flow conductivity (SFC, $10^{-7}$ cm$^3 \cdot$s/g) of 30 ($\cdot 10^{-7}$ cm$^3 \cdot$s/g) or more, or 50 ($\cdot 10^{-7}$ cm$^3 \cdot$s/g) or more, and 100 ($\cdot 10^{-7}$ cm$^3 \cdot$s/g) or less, or 70 ($\cdot 10^{-7}$ cm$^3 \cdot$s/g) or less.

The saline flow conductivity (SFC) can be measured and calculated according to methods well known to those skilled in the art, for example, the method disclosed in U.S. Pat. No. 5,562,646 at columns 54 to 59.

The super absorbent polymer prepared by the method of one embodiment can simultaneously exhibit excellent liquid permeability, water retention capacity and absorbency.

In addition, the super absorbent polymer may have T-20 of 170 seconds or less, 165 seconds or less, or 161 seconds or less, and 100 seconds or more, 110 seconds or more, or 130 seconds or more, which represents the time required for 1 g of the polymer to absorb 20 g of an aqueous solution of sodium chloride and C12 to C14 alcohol ethoxylate. This may mean the high absorption rate of the super absorbent polymer.

In addition, the super absorbent polymer may have absorbency under pressure (AUP) at 0.7 psi of 23 to 27 g/g, 23.5 to 26.5 g/g, or 24 to 26 g/g, when measured according to the EDANA method WSP 242.3-10. This may mean the excellent absorption performance under pressure of the super absorbent polymer.

In addition, the super absorbent polymer may contain polymer particles having a particle diameter of 150 to 850 μm in an amount of 90 wt % or more, or in an amount of to 98 wt %, and particles having a particle diameter of less than 150 μm in an amount of less than 2 wt %, or in an amount of 0 to 1 wt %.

As described above, the super absorbent polymer obtained according to the method of one embodiment maintains excellent absorbency such as water retention capacity and absorption rate, and satisfies excellent absorbency under pressure and liquid permeability at the same time, thereby satisfying various physical properties described above. As a result, the super absorbent polymer can be suitably used in sanitary materials such as diapers, in particular, ultra-thin sanitary materials having a reduced pulp content.

Advantageous Effects

The super absorbent polymer according to the present disclosure can exhibit improved absorption rate and liquid permeability while maintaining excellent basic absorption performance, and thus, it can be preferably applied to sanitary materials such as diapers having a thinner thickness.

DETAILED DESCRIPTION OF THE EMBODIMENTS

Hereinafter, the present invention will be described in more detail with reference to examples. However, these examples are for illustrative purposes only, and the invention is not intended to be limited by these examples.

[Comparative Example 1]: Preparation of Super Absorbent Polymer

A monomer aqueous solution having a degree of neutralization of acrylic acid of 70 mol % and a monomer concentration of 45 wt % was prepared, in which the monomer aqueous solution includes acrylic acid, sodium hydroxide, and polyethyleneglycol diacrylate (Mw=523; 0.5 wt % based on acrylic acid) as an internal cross-linking agent.

Thereafter, 1 kg of the monomer aqueous solution was firstly mixed with 31.0 g of a 0.18 wt % ascorbic acid solution and 33 g of a 1 wt % sodium persulfate solution, and then mixed with 32 g of a 0.15 wt % hydrogen peroxide solution to perform polymerization while being fed through a feeding part of the polymerization reactor capable of continuous polymerization and kneading. At this time, the temperature of the polymerization reactor was maintained at 80° C., the maximum temperature of the polymerization was 112° C., and the polymerization time was 58 sec. Thereafter, the polymerization and kneading were carried out for 20 minutes by continuing the kneading. Herein, the moisture content of the finally prepared hydrogel polymer was 50.4 wt %.

Subsequently, the hydrogel polymer was dried for 30 minutes in a hot air dryer at a temperature of 190° C., and the dried hydrogel polymer was pulverized with a pin mill. Then, it was classified with a sieve to a polymer having a particle diameter of less than 150 μm and a polymer having a particle diameter of 150 μm to 850 μm.

Thereafter, the surface of the super absorbent polymer was treated by spraying a surface treatment solution containing 1.5 parts by weight of ethylene carbonate based on 100 parts by weight of the prepared base polymer. In addition, in the step of treating the surface, the classified base resin powder was fed to a surface cross-linking reactor, and a surface cross-linking reaction was performed at a temperature of 190° C. or higher for 35 minutes.

Subsequently, the surface cross-linked super absorbent polymer was naturally cooled to 40° C. and dried slowly, and then a surface treated super absorbent polymer having a particle diameter of 150 to 850 μm was obtained using a sieve. The fine powder having a particle diameter of less than 150 μm was contained in the super absorbent polymer in less than 2 wt %.

[Example 1]: Preparation of Super Absorbent Polymer

A base resin powder was prepared in the same manner as in Comparative Example 1, and the surface treatment process using ethylene carbonate was also performed in the same manner as in Comparative Example 1.

After the surface treatment, the temperature of the super absorbent polymer was cooled to 90° C., and mixed with 2.0 g of a 5 wt % sodium hydroxide solution based on 100 g of the super absorbent polymer to perform an additional neutralization process.

Thereafter, the additionally neutralized super absorbent polymer was dried in an oven at 40° C. for 30 minutes, and a surface treated super absorbent polymer having a particle diameter of 150 to 850 μm was obtained using a sieve. The fine powder having a particle diameter of less than 150 μm was contained in the super absorbent polymer in less than 2 wt %.

[Example 2]: Preparation of Super Absorbent Polymer

A base resin powder was prepared in the same manner as in Comparative Example 1, and the surface treatment process using ethylene carbonate was also performed in the same manner as in Comparative Example 1.

After the surface treatment, the temperature of the super absorbent polymer was cooled to 90° C., and mixed with 10.0 g of a 5 wt % sodium hydroxide solution based on 100 g of the super absorbent polymer to perform an additional neutralization process.

Thereafter, the additionally neutralized super absorbent polymer was dried in an oven at 40° C. for 30 minutes, and a surface treated super absorbent polymer having a particle diameter of 150 to 850 μm was obtained using a sieve. The fine powder having a particle diameter of less than 150 μm was contained in the super absorbent polymer in less than 2 wt %.

[Example 3]: Preparation of Super Absorbent Polymer

A base resin powder was prepared in the same manner as in Comparative Example 1, and the surface treatment process using ethylene carbonate was also performed in the same manner as in Comparative Example 1.

After the surface treatment, the temperature of the super absorbent polymer was cooled to 90° C., and mixed with 20.0 g of a 5 wt % sodium hydroxide solution based on 100 g of the super absorbent polymer to perform an additional neutralization process.

Thereafter, the additionally neutralized super absorbent polymer was dried in an oven at 40° C. for 30 minutes, and a surface treated super absorbent polymer having a particle diameter of 150 to 850 μm was obtained using a sieve. The fine powder having a particle diameter of less than 150 μm was contained in the super absorbent polymer in less than 2 wt %.

[Example 4]: Preparation of Super Absorbent Polymer

A base resin powder was prepared in the same manner as in Comparative Example 1, and the surface treatment process using ethylene carbonate was also performed in the same manner as in Comparative Example 1.

After the surface treatment, the temperature of the super absorbent polymer was cooled to 90° C., and mixed with 2.0 g of a 7.2 wt % sodium carbonate solution based on 100 g of the super absorbent polymer to perform an additional neutralization process.

Thereafter, the additionally neutralized super absorbent polymer was dried in an oven at 40° C. for 30 minutes, and a surface treated super absorbent polymer having a particle diameter of 150 to 850 μm was obtained using a sieve. The fine powder having a particle diameter of less than 150 μm was contained in the super absorbent polymer in less than 2 wt %.

[Example 5]: Preparation of Super Absorbent Polymer

A base resin powder was prepared in the same manner as in Comparative Example 1, and the surface treatment process using ethylene carbonate was also performed in the same manner as in Comparative Example 1.

After the surface treatment, the temperature of the super absorbent polymer was cooled to 90° C., and mixed with 4.0 g of a 7.2 wt % sodium carbonate solution based on 100 g of the super absorbent polymer to perform an additional neutralization process.

Thereafter, the additionally neutralized super absorbent polymer was dried in an oven at 40° C. for 30 minutes, and a surface treated super absorbent polymer having a particle diameter of 150 to 850 μm was obtained using a sieve. The fine powder having a particle diameter of less than 150 μm was contained in the super absorbent polymer in less than 2 wt %.

[Example 6]: Preparation of Super Absorbent Polymer

A monomer aqueous solution having a degree of neutralization of acrylic acid of 72 mol % and a monomer concentration of 45 wt % was prepared, in which the monomer aqueous solution includes acrylic acid, sodium hydroxide, polyethyleneglycol diacrylate (Mw=523; 0.5 wt % based on acrylic acid) as an internal cross-linking agent, and 0.033 g of diphenyl(2,4,6-trimethylbenzoyl)-phosphine oxide as a UV initiator.

Thereafter, 1 kg of the monomer aqueous solution was firstly mixed with 3.0 of a 0.17 wt % sodium hydrogen carbonate solution, and the composition was fed through a feeding part of a polymerization reactor equipped with a movable conveyor belt. Then, UV polymerization was performed for 2 minutes by irradiating ultraviolet rays (irradiation amount: 2 mW/cm$^2$) through a UV irradiation device to prepare a hydrogel polymer. After transferring the hydrogel polymer to a cutter, it was cut to a maximum length of 0.2 cm. At this time, the moisture content of the cut hydrogel polymer was 50 wt %.

Subsequently, the hydrogel polymer was dried for 30 minutes in a hot air dryer at a temperature of 190° C., and the dried hydrogel polymer was pulverized with a pin mill. Then, it was classified with a sieve to a polymer having a particle diameter of less than 150 μm and a polymer having a particle diameter of 150 μm to 850 μm.

Thereafter, the surface of the super absorbent polymer was treated by spraying a surface treatment solution containing 1.5 parts by weight of ethylene carbonate based on 100 parts by weight of the prepared base polymer. In addition, in the step of treating the surface, the classified base resin powder was fed to a surface cross-linking reactor, and a surface cross-linking reaction was performed at a temperature of 190° C. or higher for 35 minutes.

After the surface treatment, the temperature of the super absorbent polymer was cooled to 90° C., and mixed with 2.0 g of a 10 wt % sodium hydroxide solution based on 100 g of the super absorbent polymer to perform an additional neutralization process.

Thereafter, the additionally neutralized super absorbent polymer was dried in an oven at 40° C. for 30 minutes, and a surface treated super absorbent polymer having a particle diameter of 150 to 850 μm was obtained using a sieve. The fine powder having a particle diameter of less than 150 μm was contained in the super absorbent polymer in less than 2 wt %.

[Example 7]: Preparation of Super Absorbent Polymer

A base resin powder was prepared in the same manner as in Example 6, and the surface treatment process using ethylene carbonate was also performed in the same manner as in Example 6.

After the surface treatment, the temperature of the super absorbent polymer was cooled to 90° C., and mixed with 10.0 g of a 10 wt % sodium hydroxide solution based on 100 g of the super absorbent polymer to perform an additional neutralization process.

Thereafter, the additionally neutralized super absorbent polymer was dried in an oven at 80° C. for 30 minutes, and a surface treated super absorbent polymer having a particle diameter of 150 to 850 μm was obtained using a sieve. The fine powder having a particle diameter of less than 150 μm was contained in the super absorbent polymer in less than 2 wt %.

[Example 8]: Preparation of Super Absorbent Polymer

A base resin powder was prepared in the same manner as in Example 6, and the surface treatment process using ethylene carbonate was also performed in the same manner as in Example 6.

After the surface treatment, the temperature of the super absorbent polymer was cooled to 90° C., and mixed with 2.0 g of a 7.2 wt % sodium carbonate solution based on 100 g of the super absorbent polymer to perform an additional neutralization process.

Thereafter, the additionally neutralized super absorbent polymer was dried in an oven at 40° C. for 30 minutes, and a surface treated super absorbent polymer having a particle diameter of 150 to 850 μm was obtained using a sieve. The fine powder having a particle diameter of less than 150 μm was contained in the super absorbent polymer in less than 2 wt %.

[Example 9]: Preparation of Super Absorbent Polymer

A base resin powder was prepared in the same manner as in Example 6, and the surface treatment process using ethylene carbonate was also performed in the same manner as in Example 6.

After the surface treatment, the temperature of the super absorbent polymer was cooled to 90° C., and mixed with 2.0 g of a 15 wt % sodium carbonate solution based on 100 g of the super absorbent polymer to perform an additional neutralization process.

Thereafter, the additionally neutralized super absorbent polymer was dried in an oven at 40° C. for 30 minutes, and a surface treated super absorbent polymer having a particle diameter of 150 to 850 μm was obtained using a sieve. The fine powder having a particle diameter of less than 150 μm was contained in the super absorbent polymer in less than 2 wt %.

Experimental Examples

The physical properties of each super absorbent polymer prepared in Examples and Comparative Example, and various properties in the manufacturing process were measured and evaluated in the following manner.

(1) Particle Diameter Evaluation

The particle diameters of the base resin powder and the super absorbent polymer used in Examples and Comparative Example were measured according to the EDANA (European Disposables and Nonwovens Association) WSP 220.3 method.

(2) Centrifuge Retention Capacity (CRC)

The centrifuge retention capacity (CRC) by absorption ratio under a non-loading condition was measured according to the EDANA (European Disposables and Nonwovens Association) WSP 241.3 method. After inserting $W_0$ (g, about 0.2 g) of the super absorbent polymer uniformly in a nonwoven fabric envelope and sealing the same, it was soaked in saline (0.9 wt % aqueous solution of sodium chloride) at room temperature. After 30 min, the envelope was centrifuged at 250 G for 3 minutes to drain, and the weight $W_2$ (g) of the envelope was measured. Further, after carrying out the same operation without using the super absorbent polymer, the weight $W_1$ (g) of the envelope was measured. Then, CRC (g/g) was calculated by using the obtained weight values according to the following Equation 1, and the water retention capacity was confirmed.

$$CRC\ (g/g)=\{[W_2\ (g)-W_1\ (g)-W_0\ (g)]/W_0\ (g)\} \quad [\text{Equation 1}]$$

(3) Absorbency Under Pressure (AUP)

The absorbency under pressure (AUP) of each super absorbent polymer prepared in Examples and Comparative Examples was measured according to the EDANA (European Disposables and Nonwovens Association) WSP 242.3-10 method.

First, a 400 mesh stainless steel screen was installed in a cylindrical bottom of a plastic having an inner diameter of 60 mm. $W_0$ (g, 0.90 g) of the polymer prepared in each of Examples and Comparative Examples was uniformly scattered on the screen at a temperature of 23±2° C. and a relative humidity of 45%. Thereafter, a piston which can uniformly provide a load of 4.83 kPa (0.7 psi) was placed on the polymer. Herein, the outer diameter of the piston was slightly smaller than 60 mm, there was no gap with the inner wall of the cylinder, and jig-jog of the cylinder was not interrupted. At this time, the weight $W_3$ (g) of the device was measured.

Subsequently, a glass filter having a diameter of 125 mm and a thickness of 5 mm was placed in a petri dish having a diameter of 150 mm, and saline (0.9 wt % sodium chloride) was poured in the dish. At this time, the saline was poured until the surface level of the saline became equal to the upper surface of the glass filter. After the measuring device was mounted on the glass filter, the liquid was absorbed for 1 hour under a load. After 1 hour, the measuring device was lifted, and the weight $W_4$ (g) was measured.

Then, AUP (g/g) was calculated by using the obtained weight values according to the following Equation 2.

AUP (g/g)=[$W_4$ (g)-$W_3$ (g)]/$W_0$ (g)  [Equation 2]

In Equation 2, $W_0$ (g) is an initial weight (g) of the super absorbent polymer, $W_3$ (g) is a sum of a weight of the super absorbent polymer and a weight of the device providing a load to the polymer, and $W_4$ (g) is a sum of a weight of the super absorbent polymer and a weight of the device providing a load to the polymer, after making the super absorbent polymer absorb the saline for one hour under a load (0.7 psi).

pH10.0 to pH4.0. And, $c_{HCl}$ represents the concentration (mol/liter) of HCl used for titration.

3) nCOONa and the final degree of neutralization can be calculated by the following equations:

nCOONa=ntot-nCOOH

The final degree of neutralization (mol %)=nCOONa/ntot*100

(5) T-20

An aqueous solution in which 9 g of sodium chloride and 0.1 g of Lorodac (main component: C12 to C14 alcohol ethoxylate, CAS #68439-50-9) were dissolved in 1 L of distilled water was prepared, and the time required for 1 g of the super absorbent polymer to absorb 20 g of the aqueous solution under a pressure of 0.3 psi was calculated and measured. The specific measuring method of T-20 is described in detail on pages 13 to 18 of European Patent Publication No. 2535027.

The results of the above properties are summarized in Table 1 below.

TABLE 1

| | Comp. Ex. 1 | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| Degree of neutralization (mol %) | 70 | 70.7 | 70.9 | 71.2 | 70.7 | 70.7 | 73 | 73 | 73 | 73 |
| CRC (g/g) | 27.8 | 28.3 | 28.3 | 28.5 | 28.4 | 28.3 | 29.5 | 30 | 28 | 29.5 |
| AUP (g/g) | 24.5 | 25.2 | 25.3 | 25.3 | 25.2 | 25.1 | 25.5 | 25.5 | 24.7 | 25.5 |
| SFC ($\cdot 10^{-7}$cm$^3 \cdot$ s/g) | 25 | 38 | 35 | 48 | 46 | 51 | 33 | 30 | 46 | 33 |
| T-20 (sec) | 172 | 151 | 160 | 153 | 154 | 140 | 110 | 114 | 168 | 110 |

(3) Saline Flow Conductivity (SFC)

The saline flow conductivity was measured and calculated according to the method disclosed in U.S. Pat. No. 5,556,646 at columns 54 to 59. It was measured in the same manner as the above US patent, except that the amount of the super absorbent polymer used in the measurement was changed to 1.5 g instead of 0.9 g.

(4) The Degree of Neutralization of Final Super Absorbent Polymer

For the super absorbent polymer finally prepared through a surface treatment process or an additional neutralization process in Examples and Comparative Example, extractable components were extracted and its content was measured according to the EDANA (European Disposables and Nonwovens Association) WSP 270.3-10.

The final degree of neutralization was calculated by the following method for these extractable components.

1) Carboxylate nCOOH (moles), nCOOH=($V_{NaOH}$,s-$V_{NaOH}$,b)$c_{NaOH}$ $V_{NaOH}$,s is the amount (ml) of NaOH required for titrating a filtered sample solution to pH10.0, and $V_{NaOH}$,b is the amount (ml) of NaOH required for titrating a blank solution containing no super absorbent polymer to pH10.0. And, $c_{NaOH}$ represents the concentration (mol/liter) of NaOH used for titration.

2) ntot=($V_{HCl}$,s-$V_{HCl}$,b)$c_{HCl}$ $V_{HCl}$,s is the amount (ml) of HCl required for titrating a filtered sample solution from pH10.0 to pH4.0, and $V_{HCl}$,b is the amount (ml) of HCl required for titrating a blank solution containing no super absorbent polymer from Referring to Table 1, it was confirmed that the super absorbent polymers of Examples had basic absorption performance equivalent to or higher than that of Comparative Example, and exhibited excellent liquid permeability and absorption rate compared to Comparative Example.

The invention claimed is:

1. A preparation method of a super absorbent polymer, comprising:
    forming a hydrogel polymer by cross-linking and polymerizing a monomer composition comprising a water-soluble ethylene-based unsaturated monomer having at least partially neutralized acidic groups and an internal cross-linking agent;
    drying, pulverizing and classifying the hydrogel polymer to form a base resin powder;
    forming a surface cross-linked layer by further cross-linking a surface of the base resin powder in the presence of a surface cross-linking agent; and
    additionally neutralizing the base resin powder by treating the base resin powder with a basic solution after the forming of the surface cross-linked layer, to form the super absorbent polymer;
    wherein the water-soluble ethylene-based unsaturated monomer has a degree of neutralization of less than 72 mol % during the forming of the hydrogel polymer,
    wherein extractable components of the super absorbent polymer have a degree of neutralization of greater than 70 mol % to 80 mol %,
    wherein the degree of neutralization of the extractable components of the super absorbent polymer is greater than the degree of neutralization of the monomer, wherein the basic solution is used in an amount of 1 to 10 parts by weight based on 100 parts by weight of the base resin powder.

2. The preparation method of a super absorbent polymer of claim 1,
wherein the additional neutralization comprises additionally neutralizing the base resin powder by treating it with the basic solution after a surface cross-linking reaction is initiated by adding the surface cross-linking agent to the base resin powder and heating to a temperature of 100° C. or higher,
wherein the basic solution contains $Na^+$ ions.

3. The preparation method of a super absorbent polymer of claim 2,
wherein the basic solution is an aqueous solution of sodium hydroxide, an aqueous solution of sodium hydrogen carbonate or an aqueous solution of sodium carbonate.

4. The preparation method of a super absorbent polymer of claim 1,
wherein the surface cross-linking agent comprises at least one of polyalcohol-based compounds, polyepoxy-based compounds, polyamine compounds, haloepoxy compounds, condensates of haloepoxy compounds, oxazoline-based compounds, or alkylene carbonate-based compounds.

5. The preparation method of a super absorbent polymer of claim 1,
wherein the surface cross-linking is carried out by increasing an initial temperature of 20° C. to 80° C. to a maximum temperature of 140° C. to 200° C. over 10 minutes to 30 minutes, and maintaining the maximum temperature for 5 to 60 minutes for heat-treatment.

* * * * *